(12) United States Patent
Kamata (10) Patent No.: US 9,708,139 B2
(45) Date of Patent: Jul. 18, 2017

(54) SOLAR POWER PLANT CONSTRUCTION METHOD

(71) Applicants: CLEAN ENERGY FACTORY CO., LTD., Nemuro-shi, Hokkaido (JP); MERS FORS CO., LTD., Tokyo (JP)

(72) Inventor: Hiroyuki Kamata, Tokyo (JP)

(73) Assignees: CLEAN ENERGY FACTORY CO., LTD., Nemuro-shi, Hokkaido (JP); MERS FORS CO., LTD., Tokyo (JP)

( * ) Notice: Subject to any disclaimer, the term of this patent is extended or adjusted under 35 U.S.C. 154(b) by 0 days.

(21) Appl. No.: 15/116,058

(22) PCT Filed: Apr. 22, 2015

(86) PCT No.: PCT/JP2015/062227
§ 371 (c)(1),
(2) Date: Aug. 2, 2016

(87) PCT Pub. No.: WO2015/166855
PCT Pub. Date: Nov. 5, 2015

(65) Prior Publication Data
US 2017/0137238 A1    May 18, 2017

(30) Foreign Application Priority Data
Apr. 28, 2014 (JP) ................... 2014-092713

(51) Int. Cl.
*E04G 21/14* (2006.01)
*H02S 20/10* (2014.01)
(Continued)

(52) U.S. Cl.
CPC ............... *B65G 67/24* (2013.01); *B60P 1/02* (2013.01); *B60P 1/5485* (2013.01);
(Continued)

(58) Field of Classification Search
CPC ................... H02S 20/10; E04G 21/14
(Continued)

(56) References Cited

U.S. PATENT DOCUMENTS

| 2010/0108118 A1* | 5/2010 | Luch | F24J 2/525 |
| | | | 136/244 |
| 2010/0212715 A1* | 8/2010 | Almy | F24J 2/5232 |
| | | | 136/245 |

(Continued)

FOREIGN PATENT DOCUMENTS

| JP | H11-81680 A | 3/1999 |
| JP | 2014-31198 A | 2/2014 |
| JP | 2014-31246 A | 2/2014 |

OTHER PUBLICATIONS

English Translation of the International Search Report and Written Opinion for PCT/JP2015/062227 (6 pages; 2015/2016).*

*Primary Examiner* — Rodney Mintz
(74) *Attorney, Agent, or Firm* — Manabu Kanesaka (57) ABSTRACT

A Solar power plant construction method includes a string formation step of arranging solar modules delivered to an assembly plant on support frames to form planar solar strings, a conveyance step of stacking the solar strings in a container and loading the container on a container truck to convey the container to a power plant site, and a solar string installation step of transferring the container delivered to the power plant site to a site machine and measuring distances and directions between a crane included in the site machine placed at a predetermined position of a stand array group for mounting solar array provided in the power plant site and stands to pull up the solar strings by the crane of the site machine to sequentially distribute the solar strings to respective stand positions measured in the stand position measurement step to form and fix a solar array.

8 Claims, 11 Drawing Sheets

(51) Int. Cl.

| | |
|---|---|
| *B65G 67/24* | (2006.01) |
| *B65G 59/02* | (2006.01) |
| *B60P 1/54* | (2006.01) |
| *B60P 1/02* | (2006.01) |
| *G01S 17/08* | (2006.01) |
| *G01S 17/50* | (2006.01) |

(52) U.S. Cl.
CPC ........... *B65G 59/026* (2013.01); *E04G 21/14* (2013.01); *G01S 17/08* (2013.01); *G01S 17/50* (2013.01); *H02S 20/10* (2014.12); *B65G 2814/031* (2013.01)

(58) Field of Classification Search
USPC .......................................................... 52/143
See application file for complete search history.

(56) References Cited

U.S. PATENT DOCUMENTS

| | | | | |
|---|---|---|---|---|
| 2011/0303262 | A1* | 12/2011 | Wolter | H02S 20/00 |
| | | | | 136/251 |
| 2016/0060860 | A1* | 3/2016 | Porter | E04B 1/348 |
| | | | | 52/747.1 |
| 2016/0065121 | A1* | 3/2016 | Bugg | H02S 20/32 |
| | | | | 29/525.08 |
| 2017/0012158 | A1* | 1/2017 | Tumminelli | H02S 40/22 |

\* cited by examiner

VIEW FROM A

SOLAR POWER PLANT CONSTRUCTION METHOD

RELATED APPLICATIONS

The present application is National Phase of International Application No. PCT/JP2015/062227 filed Apr. 22, 2015, and claims priority from Japanese Application No. 2014-092713, filed Apr. 28, 2014, the disclosure of which is hereby incorporated by reference herein in its entirety.

TECHNICAL FIELD

The present invention relates to a solar power generation plant (generally termed as a solar power plant or a photovoltaic power plant), construction method of conveying, to a site of a power plant, solar strings assembled as integrated components by arranging a large number of solar power generation modules (solar power module) in series and mounting the solar strings on stands arranged in a field of the site to install the solar strings in an array.

BACKGROUND ART

Solar power plant/equipment utilizing solar light has become widely used along with diversification of energy resources. Although small-scale power equipment on a scale of installation on roofs of houses has been drawing attention from the beginning, construction of large-scale solar power plants (so-called mega solar power plants) exceeding 1000 KW is thriving due to the lack of energy sources in recent years or from the viewpoint of controlling emissions of $CO_2$. Hereinafter, an installation location of a photovoltaic power plant will also be called a "power plant site", a location of the power plant site will also be called a "field", a unit solar power panel will also be called a "solar module", an elongated panel with several or more than ten modules integrated in series will also be called a "solar string", and a parallel array of a large number of "solar strings" will also be called a "solar array", expediently.

In the construction of this type of solar power plant, a plurality of solar modules are integrated by parallel beams or frame-shaped module support frames to form solar strings, and the solar strings are arranged in an array on stands provided in a power plant site. The assembly and the installation work of the solar strings are generally performed in the power plant site (for example, Patent Document 1). A method is also known, in which the solar strings are assembled in a plant, and the solar strings are housed in a container and transported to the power plant site (Patent Document 2).

CITATION LIST

Patent Document

Patent Document 1: JPA-1999-81680
Patent Document 2: JPA-2014-31198

SUMMARY OF INVENTION

Technical Problem

In a mega solar power plant, a large number of solar strings are arranged and installed in an array in the power plant site, and tens of thousands to hundreds of thousands of solar modules are installed in the power plant site. When a roof of a house is the power plant site, the method of assembling and arranging the solar modules in the power plant site as described in Patent Document 1 can be suitable. However, particularly in the mega solar power plant provided with a great quantity of solar modules, performing assembly work (assembly) of the solar modules in the power plant site, wiring work between the solar modules, and installation work for predetermined arrangement and fixation of solar strings including assembled solar modules all in the power plant site is not efficient from the viewpoints of the working time, the safety of workers, the instability of the construction period affected by weather and the like, the cost, and the like.

In general, the solar modules shipped from the module factory are installed one by one in the power plant site instead of assembling the solar strings in an estimated field of the power plant, and the work is not efficient. More specifically, in the method of housing the solar modules in a container or the like to transport the solar modules to the power plant site to attach the solar modules to the stands provided in the field, all of the delivery of the solar strings from the container reaching the power plant site, the delivery of the solar strings to the stands, the attachment work, and the cabling work are performed by human power. Therefore, a large number of workers and a long-term construction period are necessary, and ensuring the safety of the workers is also a big problem. As a result, a large amount of cost is required to construct a solar power plant (solar power facility).

An object of the present invention is to provide a solar power plant construction method that can ensure safety of work in a short-term construction period and that can be installed at a low cost.

Solution to Problem

To achieve the above mentioned object, solar strings are assembled by fixing a plurality of solar modules to support frames and forming integrated components (units), and work, such as wiring between solar modules in the solar strings, is performed in a plant (pre-assembly line) in the present invention. The pre-assembly line is an assembly type and can be transported by a container or the like. Therefore, the installation location of the pre-assembly line is arbitrary. For example, it is desirable to provide the pre-assembly line in an accumulation place of solar modules from a domestic manufacturer or solar modules imported from abroad. The assembled solar strings are transported to the power plant site by a solar string dedicated container. In the power plant site, the solar string dedicated container is transferred to a power plant site construction dedicated heavy machine. The power plant site construction dedicated heavy machine includes: a container transfer apparatus; a dedicated crane that takes out the solar strings from the solar string dedicated container to arrange the solar strings on predetermined stands; and laser ranging means for measuring positions of the stands.

The power plant site construction dedicated heavy machine is transported to a predetermined position of a location (field) of the power plant site, and positions of the stands for arranging the solar strings on the field are measured by using the laser ranging means to acquire arrangement position information. Then, the site construction dedicated heavy machine is used to install the solar strings on the stands according to the acquired arrangement position information. A solar power plant is constructed in the series of flow process. A representative configuration of the present invention is as follows.

(1) Provided is a solar power plant construction method of arranging a large number of solar strings in an array to form a large-scale power generation plant (so-called mega solar power plant), the solar power plant construction method sequentially executing:

a string formation step of delivering solar modules to a pre-assembly factory provided in a place different from a power plant site to arrange a predetermined number of unpacked solar modules on support frames to fix the solar modules as solar strings and applying cabling work in string for connecting the solar modules by electric cables in the solar strings to form planar solar strings;

a string dedicated container conveyance step of stacking and housing a plurality of the solar strings in a string dedicated container and loading the string dedicated container on a container truck to convey the string dedicated container to the power plant site;

a string dedicated container arrangement step of transferring the string dedicated container delivered to the power plant site to a site construction dedicated heavy machine and placing the site construction dedicated heavy machine at a predetermined position of a stand array group for mounting solar array provided in a field of the power plant site;

a stand position measurement step of measuring distances and directions (horizontal angles) between a string dedicated crane included in the site construction dedicated heavy machine placed at the predetermined position of the stand array group and the stands; and a solar string installation step of running the string dedicated crane of the site construction dedicated heavy machine to pull up the solar strings stacked and housed in the string dedicated container from above the string dedicated container to sequentially distribute the solar strings to respective stand positions measured in the stand position measurement step to form and fix a solar array and applying cabling in solar array for applying wiring connection between strings in solar array and cabling in site for applying wiring connection in site.

(2) The string dedicated container according to (1) includes a string raising mechanism that sequentially moves a next solar string to an uppermost layer every time the string dedicated crane included in a string dedicated heavy machine pulls up one solar string on the uppermost layer among the solar strings loaded inside of the string dedicated container.

(3) The string dedicated crane of the site construction dedicated heavy machine according to (1) includes: crane control means; crane arm movement control means; and arm movement information processing means for providing movement information of an arm obtained in the stand position measurement step to the crane arm movement control means, and a range of the stands covered by the arrangement work of the solar strings by the arm around the placement position of the site construction dedicated heavy machine is limited.

(4) The site construction dedicated heavy machine according to (1) includes laser ranging means provided at a predetermined height looking into a height above the ground of the solar strings to be arranged and configured to measure the distances and the directions of the stands covered by the arrangement work of the solar strings by the arm of the string dedicated crane around the placement position of the solar power plant site construction dedicated heavy machine, and the arm movement information processing means uses stand position information from stand position information stored in storage means for storing position information of the stands measured by the laser ranging means to control movement of the string dedicated crane and uses the position information of the stands stored in the storage means to transfer the solar strings hung out from the string dedicated container by the string dedicated arm to the stands.

(5) The position information of the distances and the directions of the stands calculated by the laser ranging means according to (3) is calculated based on reflected light of a laser beam applied to reference poles sequentially disposed at a predetermined height near centers of the stands on which the solar strings are mounted according to the height above the ground of the laser ranging means.

(6) The laser ranging means according to (3) is provided on left and right sides of the site construction dedicated heavy machine and measures the position information of the distances and the directions of the stands in a working limit of the string dedicated crane on the left and right sides.

(7) The site construction dedicated heavy machine according to (1) to (5) is sequentially moved and placed in a connection area outside of the range after completion of the installation of the solar strings on the stands in the limited range to execute the stand position measurement step and the solar string installation step.

(8) The solar string is formed by ten or eleven solar modules.

It is obvious that various changes can be made in the present invention without departing from the technical scope described in the configuration and the detailed description of the invention described later.

Advantageous Effects of Invention

A dedicated factory for comprehensively executing solar string assembly work of fixing a plurality of solar strings on support frames, applying ancillary work, such as wiring between solar cells, and performing delivery inspection is installed at a place different from the power plant site. Therefore, selection of solar modules required for each power plant site and the size and the quantity of solar strings can be flexibly handled. As for cabling in the solar strings, a circuit terminal of each solar module is a one-touch connector type, and cabling in a short time is possible. Cabling between solar strings in the solar power plant site is also a similar type.

The laser ranging means for measuring the distances and the directions between the string dedicated crane including a slide arm and the stands is provided on the dedicated heavy machine (power plant site construction dedicated heavy machine) used to install the strings (installation on the stands) in the power plant site. The power plant site construction dedicated heavy machine is placed at an initial position of the power plant site. The laser ranging means stores the distances from the stands in a service available range of the arm of the string dedicated crane and the directions (horizontal direction angles from the string dedicated crane) in the storage means of the system as position information of the stands. In the string dedicated crane provided on the power plant site construction dedicated heavy machine, a vacuum suction apparatus (vacuum gripper) pulls up the solar strings stored in the string dedicated container, and the strings are sequentially arranged on the stands according to the position information of the stands stored in the storage means.

The measurement by the laser ranging means is performed on both sides of the power plant site construction dedicated heavy machine, and the solar strings can be arranged on the stands provided on both sides of the power plant site construction dedicated heavy machine. The standard of the position measurement of the stands can be an initial state of direction (default position) of laser heads at the placement position of the power plant site construction dedicated heavy machine.

After the solar strings are arranged and fixed to the stands in a service range of the string dedicated arm (maximum turning range of arm) of the string dedicated crane at the initial position, the power plant site construction dedicated heavy machine is moved and placed at the next work position of the power plant site. The next work position is a position adjacent to the arm service range of the string dedicated crane at the initial position.

At the next work position, the procedure of the stand position measurement and the arrangement of the solar strings that is the same as the work at the initial position are repeated. The work is executed for all stands in the power plant site, and all solar strings in the field are installed.

According to an on-site simulation in relation to working time, for example, the time for fixing one solar string to the stand is about 2.5 minutes when one dedicated crane operator (also serves as a driver of the heavy machine) and four workers for the fixation to the stands are deployed as human resources working in the power plant site, wherein eleven solar modules of about 1 m×2 m in the plan-view dimension and the vertical size are used to form a solar string of about 2 m×11 m.

Therefore, in the construction of the mega solar power plant, the working time can be significantly reduced, including the number of solar strings included in the service range of the arm included in the crane of the power plant site construction dedicated heavy machine, and the time required to move the power plant site construction dedicated heavy machine and measure the distances from the stands. As a result, the construction cost of the mega solar power plant can be reduced significantly.

DESCRIPTION OF EMBODIMENT

Hereinafter, an embodiment of the present invention will be described in detail with reference to the drawings of the embodiment.

First Embodiment

Figure 1:
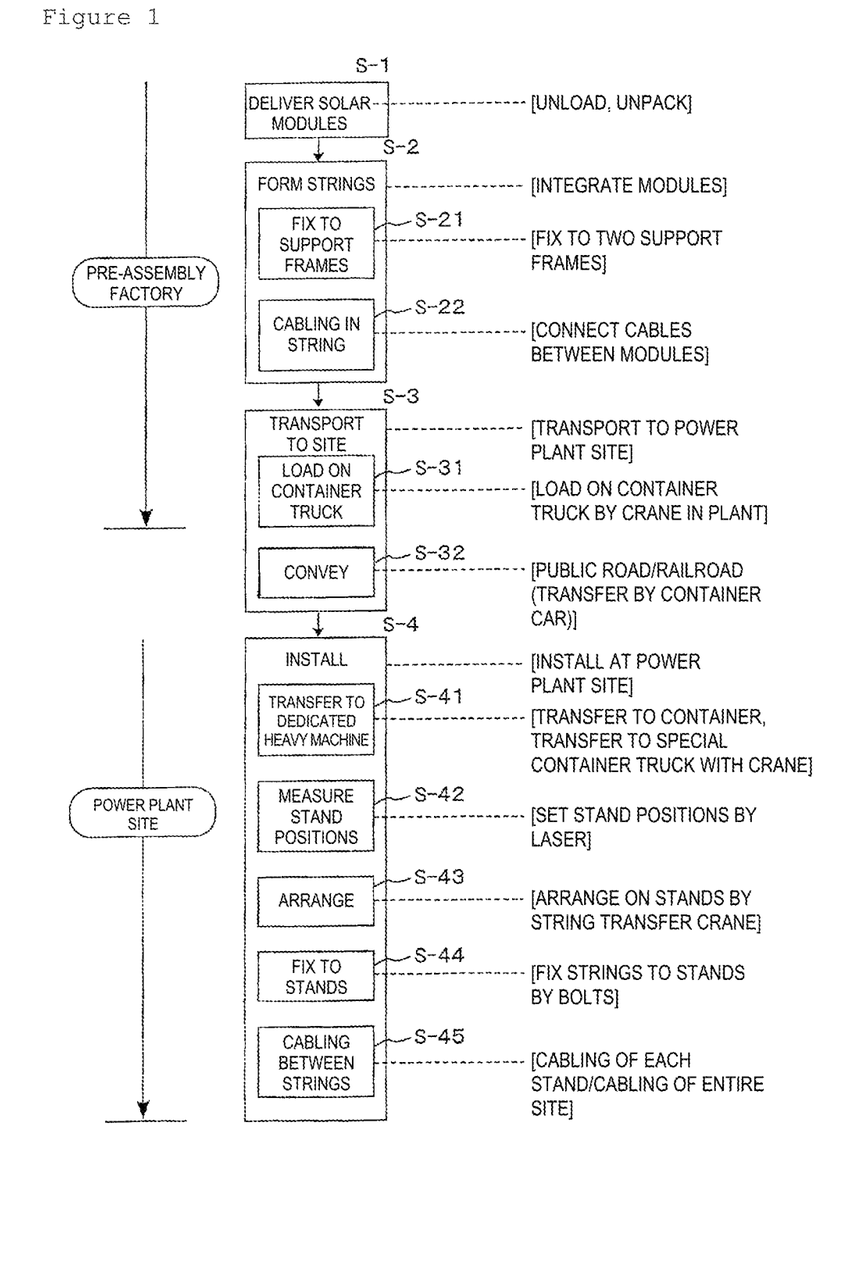
FIG. 1 is a flow chart describing an outline of a work procedure of a solar power plant construction method according to the present invention.
Figure 2:
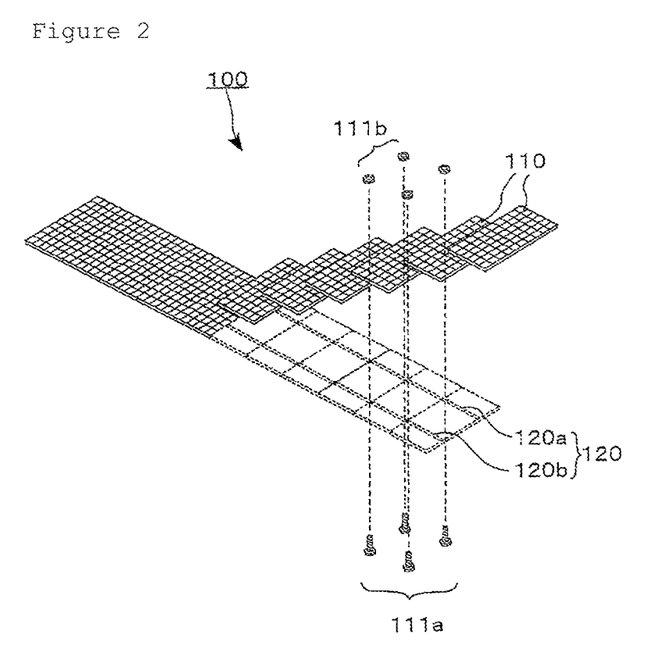
FIG. 2 is an explanatory diagram of a solar string formation step used in solar power plant construction according to the present invention.
Figure 4:
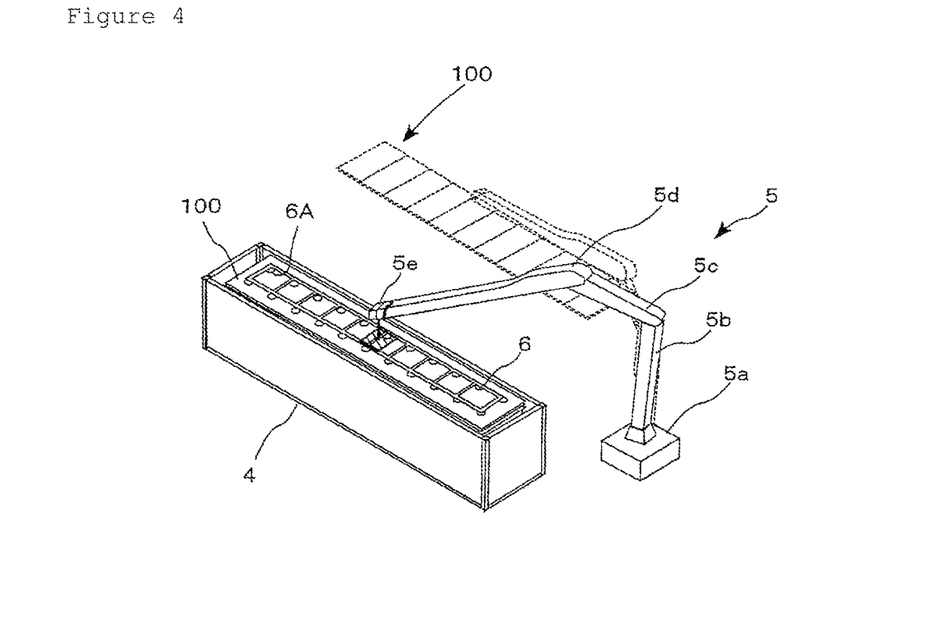
FIG. 4 is an explanatory diagram of a mode of storing, in a dedicated container, a large number of solar strings assembled in a pre-assembly factory according to the present invention.
Figure 5:
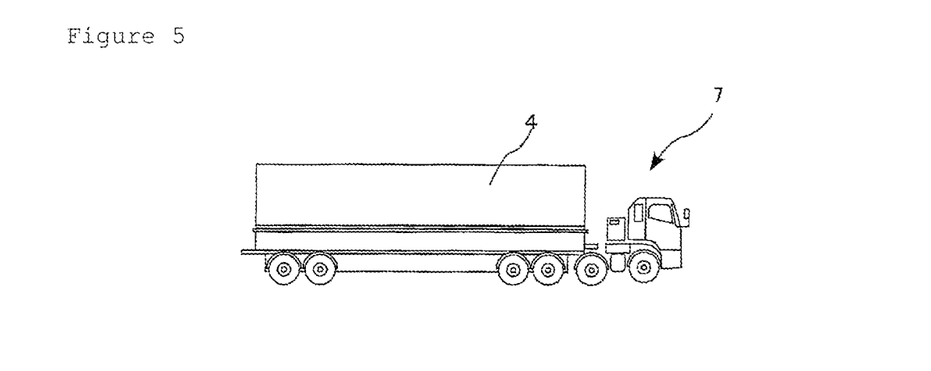
FIG. 5 is an explanatory diagram of a container truck used in the solar power plant construction according to the present invention.
Figure 6:
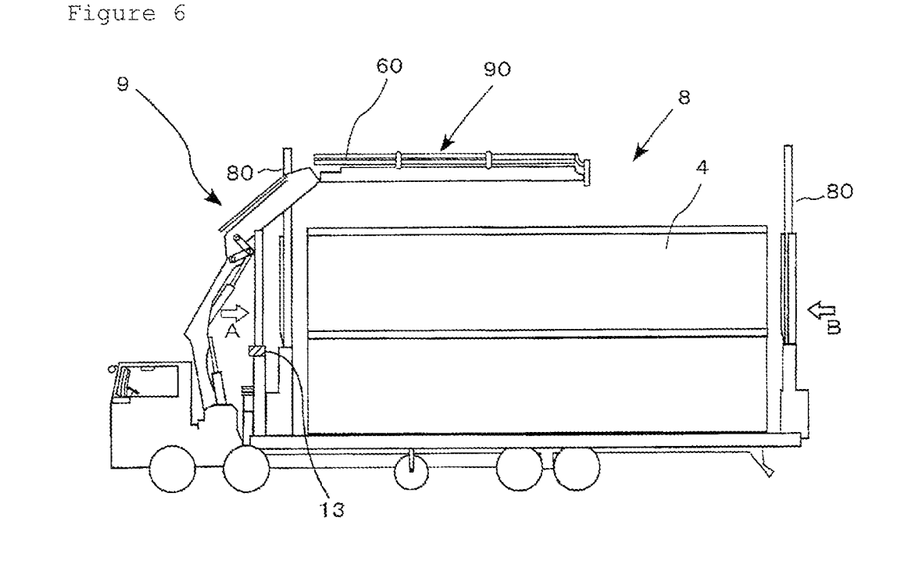
FIG. 6 is an explanatory diagram of a power plant site construction dedicated heavy machine waiting in a power plant site used in the solar power plant construction according to the present invention.
Figure 7:
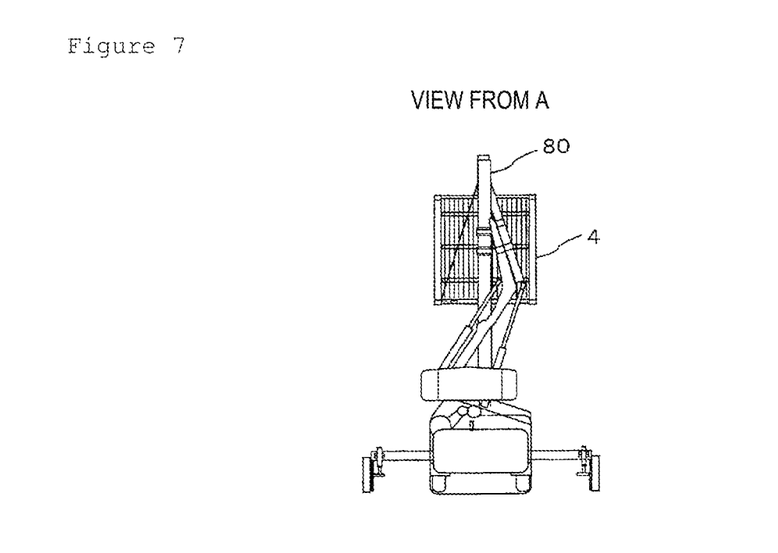
FIG. 7 is a schematic diagram of a front surface of a dedicated container, viewing the power plant site construction dedicated heavy machine in an arrow A direction of FIG. 6 according to the present invention.
Figure 8:
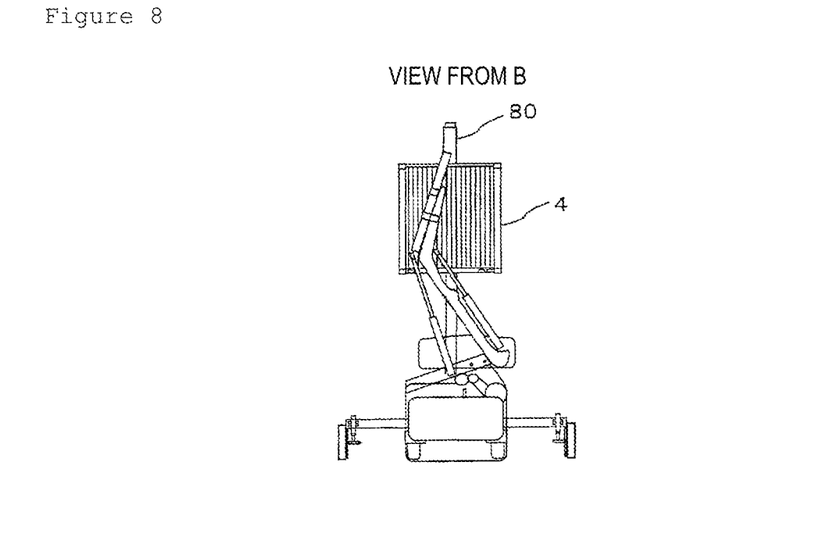
FIG. 8 is a schematic diagram of a back surface of the dedicated container, viewing the power plant site construction dedicated heavy machine in an arrow B direction of FIG. 6 according to the present invention.

FIG. 1 is a flow chart describing an outline of a work procedure of a solar power plant construction method according to the present invention. FIG. 2 is an explanatory diagram of a solar string formation step used in solar power plant construction according to the present invention. FIGS. 3A, 3B, 3C and 3D are explanatory diagrams of an example of structure of assembled solar strings used in the solar power plant construction according to the present invention. FIG. 4 is an explanatory diagram of a mode of storing, in a dedicated container, a large number of solar strings assembled in a pre-assembly factory. FIG. 5 is an explanatory diagram of a container truck. FIG. 6 is an explanatory diagram of a power plant site construction dedicated heavy machine waiting at a power plant site. FIG. 7 is a schematic diagram of a front surface of the power plant site construction dedicated heavy machine and a dedicated container as viewed in an arrow A direction of FIG. 6. FIG. 8 is a schematic diagram of a back surface of the power plant site construction dedicated heavy machine and the dedicated container as viewed in an arrow B direction of FIG. 6.

The flow of the work procedure shown in FIG. 1 will be described with reference to FIGS. 2 to 8. The work procedure of the present invention includes work in a pre-assembly factory for assembling solar strings and work in a power plant site for arranging and installing the solar strings transported from the pre-assembly factory on stands. The pre-assembly factory is installed in a place not related to a field of a specific installation location of a solar power plant (solar power plant site, also simply called power plant site). Solar modules are assembled to form a string, and the arrangement in the field is simplified in the power plant site. In the power plant site, solar modules are collected from inside or outside of the country through a land route or a sea route, and the solar modules are unloaded and unpacked. The solar modules are delivered to an assembly line (step S-1, hereinafter, simply written as S-1).

Delivered solar modules 110 are transferred to a string formation step (S-2). In the string formation work, the solar modules 110 are first arranged on a plurality of support frames (in the present embodiment, two parallel cross beams) 120 (120*a*, 120*b*) and fixed by bolts or the like as shown in FIGS. 2 and 3 (S-21). In the fixation, a predetermined number of solar modules 110 (here, eleven modules) are aligned in a longitudinal direction of the pair of support frames 120 (120*a*, 120*b*) and fixed by bolts and nuts 111 (bolts 111*a* and nuts 111*b*) to assemble the solar modules 110 into a solar string 100 as shown in FIG. 2. The fixing means is not limited to the simple fixation using bolts and nuts, and auxiliary fixation metal fittings may be used. FIGS. 2 and 3 show fixation using only bolts and nuts.

Figure 3A:
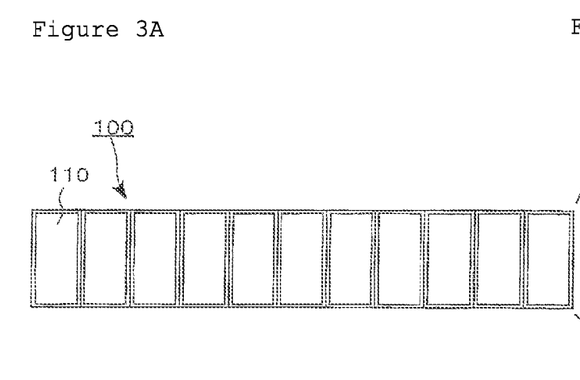
FIGS. 3A, 3B, 3C and 3D are explanatory diagrams of an example of structure of assembled solar strings used in the solar power plant construction according to the present invention.
Figure 3B:
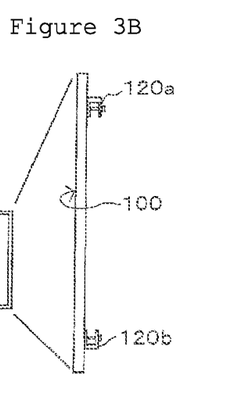
Figure 3C:
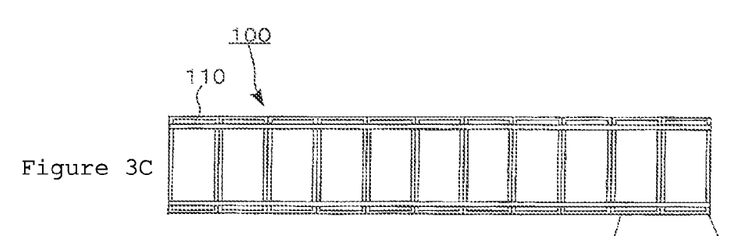
Figure 3D:
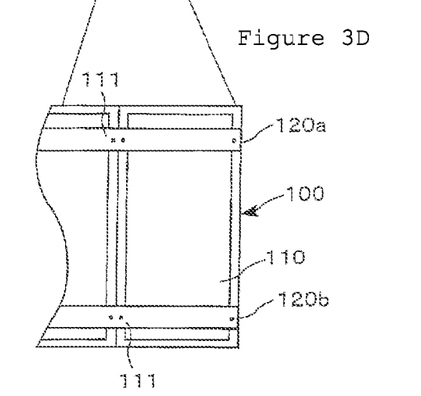

As shown in FIG. 3A, the support frames 120 (120*a*, 120*b*) are elongated frames with U-shaped cross section, wherein titanium is suitable. However, an appropriate metallic material, such as rust-preventive iron material, stainless material, and aluminum, or a reinforced resin material can also be used. The support frames are not limited to the U-shaped cross section, and an H-shaped cross section, an L-shaped cross section, a circular or elliptical cross section, or other distortion-resistant structures and weather-resistant materials can be adopted.

After the plurality of solar modules 110 are fixed to the support frames 120, cabling in string for connecting electric wiring between the solar modules is performed (S-22). Although not shown, outlets and plugs capable of one-touch connection are provided on the output wiring of the cells, and the cabling work between adjacent solar modules 110 is simplified. It is preferable to apply waterproof means to the connection section in advance. The solar string 100 assembled in this way is loaded and housed in a string dedicated container 4 shown in FIG. 4. Although an in-plant crane 5 fixed and installed on the pre-assembly factory is used for the loading, other handling facilities, such as movable cranes, may also be used.

In the in-plant crane 5, a first arm 5*c* and a second arm 5*d* are attached to a pillar 5*b* planted on a base 5*a*, and vacuum suction means (vacuum gripper) 6 is provided at a tip of the second arm 5*d*. The vacuum suction means 6 includes a large number of vacuum suction pads 6A, and the vacuum suction pads 6A are adsorbed to the surface of the solar string 100. The plane distortion of the vacuum suction pads 6A is minimized, and the vacuum suction pads 6A are pulled up and down and housed in the string dedicated container 4. It is preferable that the vacuum suction pads are arranged to correspond to the solar modules included in the solar string. Each of the solar strings 100 that have passed a delivery inspection at the last stage of the pre-assembly step is numbered by a bar code or the like at the factory shipment. The numbering is used to consistently manage from the factory shipment to the installation at the power plant site as well as the operation and the monitoring after the installation. The vacuum suction means 6 of the in-plant crane 5 sequentially loads the monitored solar strings 100 into the string dedicated container 4. Note that at a production plant of the solar modules, an identification code (module identification code) is provided to each of the solar modules.

The string dedicated container 4 loaded with a scheduled number of solar strings 100 is transferred to a transport step in the power plant site (site transport step S-3). In the site transport step, the string dedicated container 4 is mounted on a normal container truck (trailer truck) 7 (S-31). The container truck 7 loaded with the string dedicated container takes off toward a designated power plant site (convey S-32). In consideration of the convenience of traffic, intermediate transport of the string dedicated container 4 by a container wagon (container car) may be performed if it is advantageous in terms of transport cost, such as when transport by rail to halfway is possible, and the power plant site is at a remote location. When the assembly plant of the solar strings is installed in the power plant site, a power plant site construction dedicated heavy machine described later can directly transport the string dedicated container 4.

The container truck 7 loaded with the string dedicated container 4 arrives at the power plant site, and the procedure enters a string installation step at the power plant site (S-4). A power plant site construction dedicated heavy machine (specially rigged heavy machine) 8 waits at the power plant site. The power plant site construction dedicated heavy machine 8 is equipped with: a container transfer apparatus 80; a string dedicated crane 9 including a slide arm 90 and vacuum suction means 60; and laser heads 13 of laser ranging means. The laser heads 13 of the laser ranging means are provided on both sides of the power plant site construction dedicated heavy machine 8, and it is preferable that the laser heads 13 are installed to be able to vertically rise and fall along both side surfaces of the power plant site construction dedicated heavy machine 8. The container transfer apparatus 80 pulls up and transfers the string dedicated container 4 to the power plant site construction dedicated heavy machine 8.

The dedicated crane 9 is provided with the vacuum suction apparatus (vacuum gripper) 60 that sucks the surfaces of the solar strings to pull up and down the solar strings, like the one described in FIG. 4. FIG. 6 shows a state in which the vacuum suction apparatus 60 is folded. In the installation step (S-4), a crane installed in the power plant site or the container transfer apparatus 80 included in the power plant site construction dedicated heavy machine 8 pulls down and transfers the string dedicated container 4 loaded on the container truck to a loading space of the power plant site construction dedicated heavy machine 8 (transfer to dedicated heavy machine S-41). FIG. 7 shows a state in which the container transfer apparatus 80 pulls up the string dedicated container 4 loaded on the container truck. When a plurality of string dedicated containers 4 are temporarily accumulated in a container placement area to perform the work, the string dedicated containers 4 can be mounted on the loading space of the power plant site construction dedicated heavy machine 8 at the accumulation place.

The power plant site construction dedicated heavy machine 8 that has transferred the string dedicated container 4 from the container truck moves to an initial work position of a field (location where a large number of stands for mounting the solar strings are arranged) of the power plant site. The initial work position may be an edge of a row of stands arranged and installed in the field or may be in the middle of the row of stands. It is efficient that the power plant site construction dedicated heavy machine 8 arranges the solar strings on the row of stands for mounting the solar strings 100, on both sides in the middle of the row of stands, rather than at the edge of the row of stands.

Figure 9:
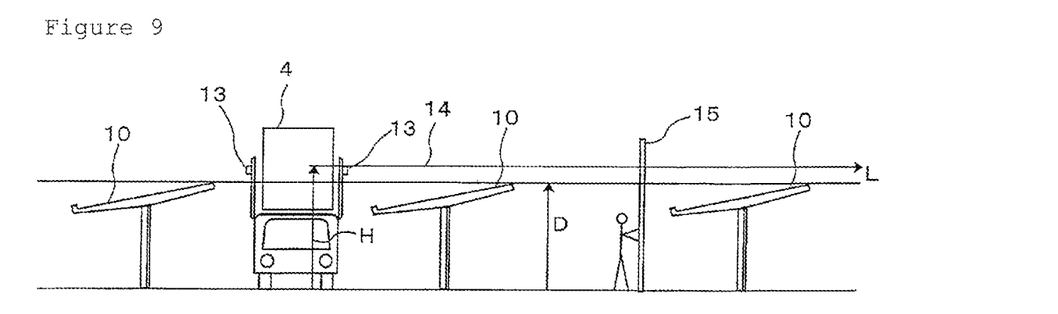
FIG. 9 is an explanatory diagram of a measurement method of stand positions using laser ranging means installed on the power plant site construction dedicated heavy machine.
Figure 10:
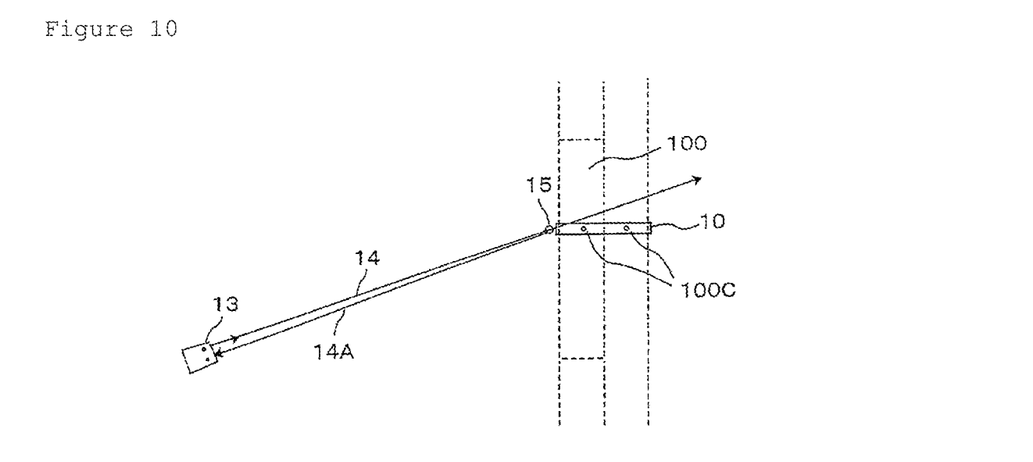
FIG. 10 is a schematic view describing an example of a measurement method of a stand position using a reference pole.
Figure 11:
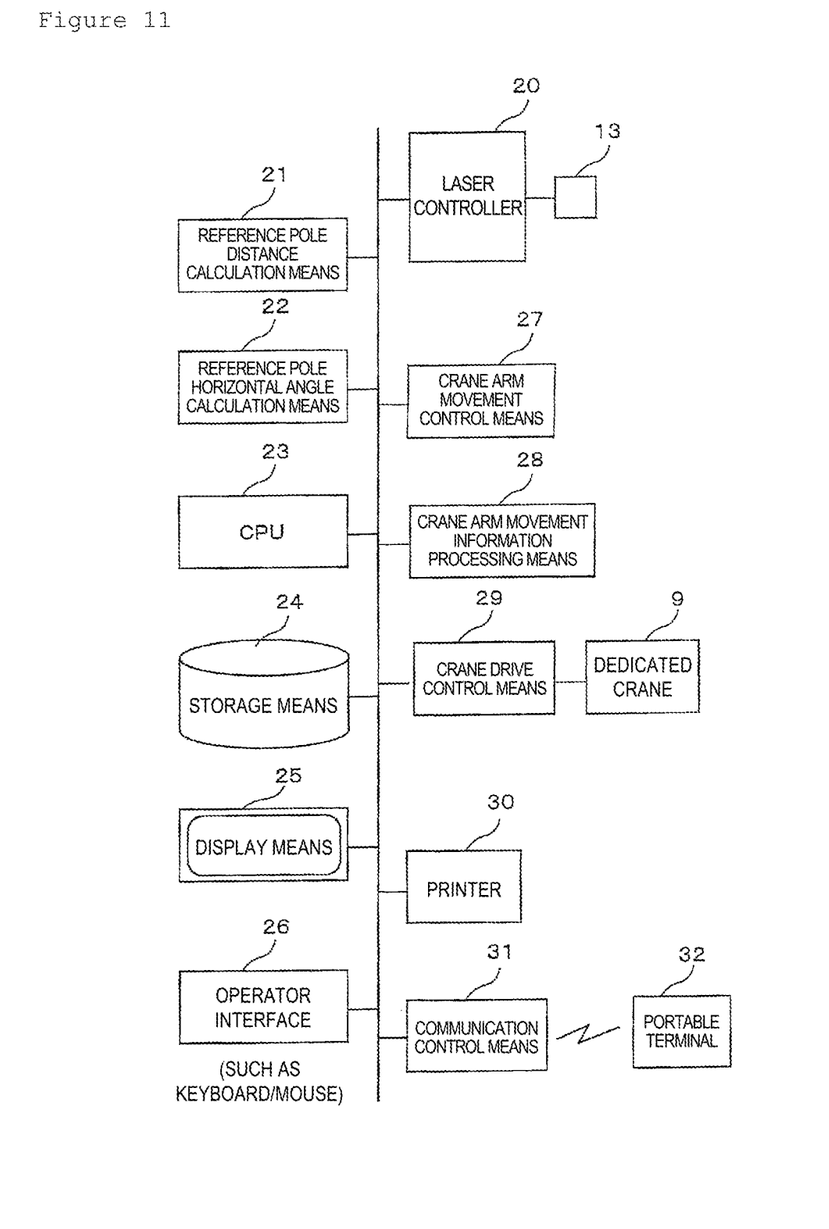
FIG. 11 is a functional block diagram describing an example of stand position measurement in the power plant site construction dedicated heavy machine and an installation control system of the solar strings according to the present invention.

Next, position measurement of a large number of stands installed in the field of the power plant site will be described. FIG. 9 is an explanatory diagram of a measurement method of stand positions using the laser ranging means installed on the power plant site construction dedicated heavy machine 8. FIG. 10 is a schematic view describing an example of a measurement method of the stand positions using a reference pole. FIG. 11 is a functional block diagram describing an example of stand position measurement in the power plant site construction dedicated heavy machine and an installation control system of the solar strings according to the present invention.

At the initial work position, the laser heads 13 of the laser ranging means installed on the power plant site construction dedicated heavy machine 8 are first used, and positions of the stands 10 in a range that allows the arm 90 of the dedicated crane 9 to install the solar strings 100 (service range of the arm 90 of the dedicated crane) from a current position (initial work position) and position information in a horizontal direction are obtained by reference pole position calculation means 21 using a reference pole 15. The laser heads 13 are installed to emit a laser beam at a position slightly higher than a predetermined height H, for example H=2.5 m, from the ground, in a range of 180 degrees in the horizontal direction. Workers manually and sequentially plant and hold the reference poles 15 at a height blocking a laser beam L emitted from the laser heads 13, near the stands 10 on which centers 100C of the solar strings should be arranged.

The height H above the ground of the laser heads 13 is set to a value slightly higher than a height D of a top of the stand 10 and slightly higher than a height of a top of the solar string when the solar string is installed on the stand. The laser heads 13 are controlled by a laser controller 20 to receive reflected light from the reference pole 15 and provides a light reception signal to the reference pole distance calculation means 21 and reference pole horizontal angle calculation means 22 to calculate the distance and the angle. The calculated position information of the reference pole is stored in storage means 24 as stand position information (measure stand positions S-42). The stand position information also includes a sequence schedule of the stands for arranging the solar strings. Although it is desirable to start arranging the solar strings from the stand closest to the power plant site construction dedicated heavy machine 8, the arrangement of the solar strings may be started from the stand at an appropriate place depending on the state of the field (such as slope land and stand arrangement state).

A laser beam 14 emitted from the laser head 13 becomes reflected light 14A at the reference pole 15 planted at a position near the center part 100C of the solar string 100 to be installed, and the reflected light 14A returns to the laser head 13, as shown in FIG. 10. The reference pole distance calculation means 21 calculates the distance between the laser head 13 and the reference pole 15 based on the difference between the emitted laser beam 14 and the reflected light 14A on the time axis or based on the phase difference between laser waves of the laser beam 14 and the reflected light 14A. The reference pole horizontal angle calculation means 22 calculates the angle between the direction of the reference position of the laser head (default position before measurement) and the position of the currently measured stand direction (reflected light position of laser beam).

The solar string is arranged on the measured stand position by movement of a dedicated crane based on the value measured with the laser beam. A small number of skilled workers accurately position and fix the solar strings on the stands. Although it is preferable to measure the position of each stand based on the reference pole 15 in terms of accuracy, those skilled workers manually determine the final installation positions of individual solar strings. Therefore, the measurement using the reference pole can be performed at important points of the row of stands, and predicted values can be set for stand positions between the measurement points.

After the measurement of the positions of the stands, the power plant site construction dedicated heavy machine 8 opens the upper lid of the dedicated container 4 and deploys the vacuum suction means 60 attached to the arm 90 of the dedicated crane 9 shown in FIG. 6. The plurality of vacuum pads 6A included in the vacuum suction means 60 suck and pull up the uppermost solar string housed in the dedicated container 4. As for the arm 90 of the string dedicated crane 9, crane arm movement control means 27 and arm movement information processing means 28 cause the arm 90 of the string dedicated crane 9 to sequentially move back and forth between the dedicated container 4 and predetermined stands 10 based on the stand position information and the sequence schedule stored in the storage means 24. A crane controller 29 shares functions of controlling basic operation of the string dedicated crane 9 and operation of the vacuum suction means 6A.

The control system is provided with: a CPU 23 that receives various instructions from an operator interface 26, such as a keyboard, a mouse, and a screen touch input, and that performs other control of the entire system; display means 24 for displaying progress of the work, input/output data display, and the like; a printer 30 that prints necessary data; communication control means 31; and the like. The communication control means 31 is a remote interface in executing the present system by a portable terminal (such as a tablet and a smartphone). The control system according to the present invention described above is just an example, and various configurations can be adopted within the purpose of executing the work of the present invention.

As described, the power plant site construction dedicated heavy machine that has transferred the string dedicated container moves to the initial work position of the field (location where a large number of stands for mounting the solar strings are arranged) of the power plant site. At the initial work position, the laser side distance means installed on the power plant site construction dedicated heavy machine is first used to set the positions and the directions of the stands in the range that allows installing the solar strings by the dedicated crane (service range of the crane) from the current location (initial work position), based on the position information of the reference pole obtained by the reference pole position calculation means. The arm movement information processing means uses the position information of the stands based on the position information of the reference pole, and the arm movement information processing means computes the arm movement information for arranging the solar strings. The arm movement information is stored in the storage device.

Figure 12:
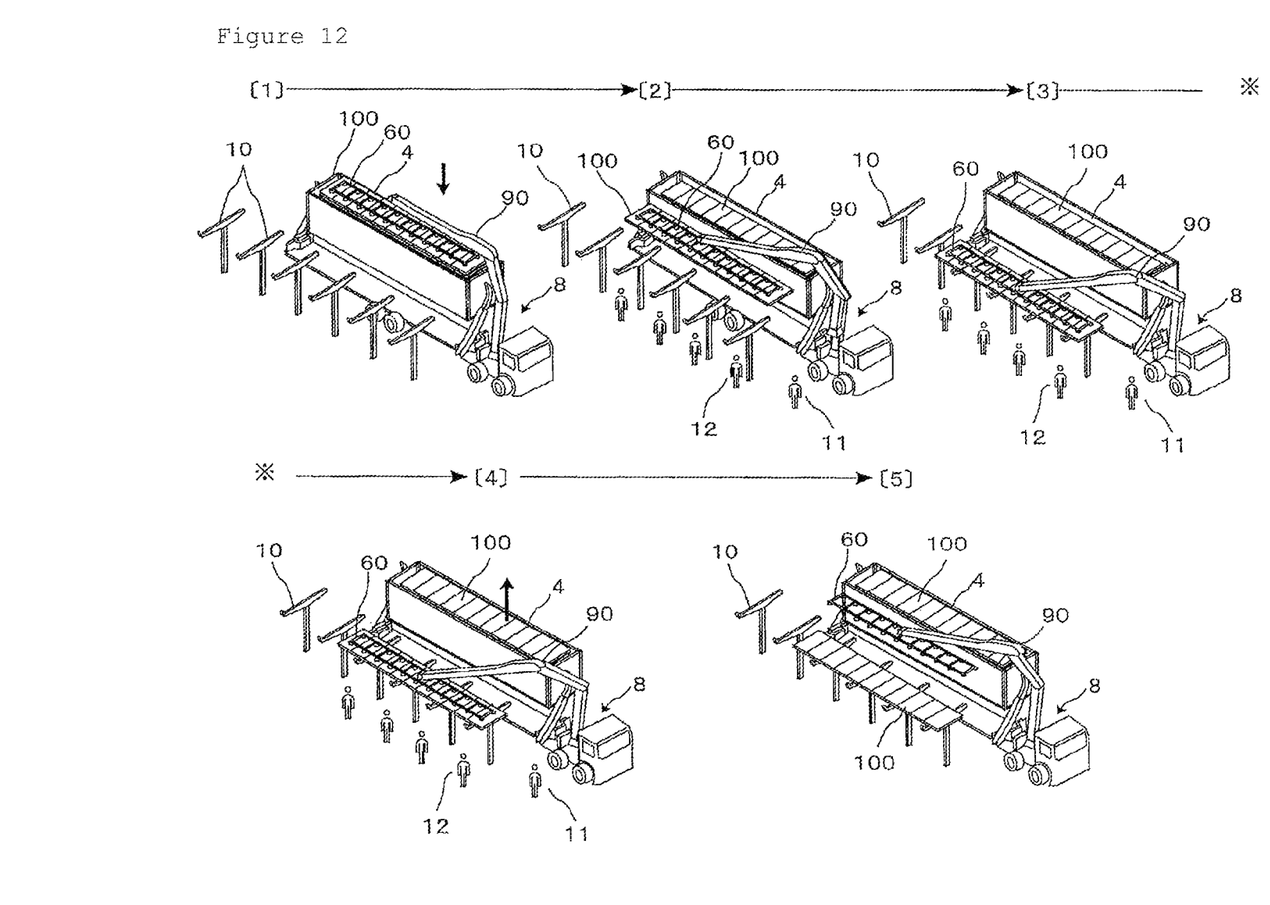
FIG. 12 is an explanatory diagram of a procedure of pulling up the solar strings from the solar string dedicated container and arranging the solar strings on stands.
Figure 13:
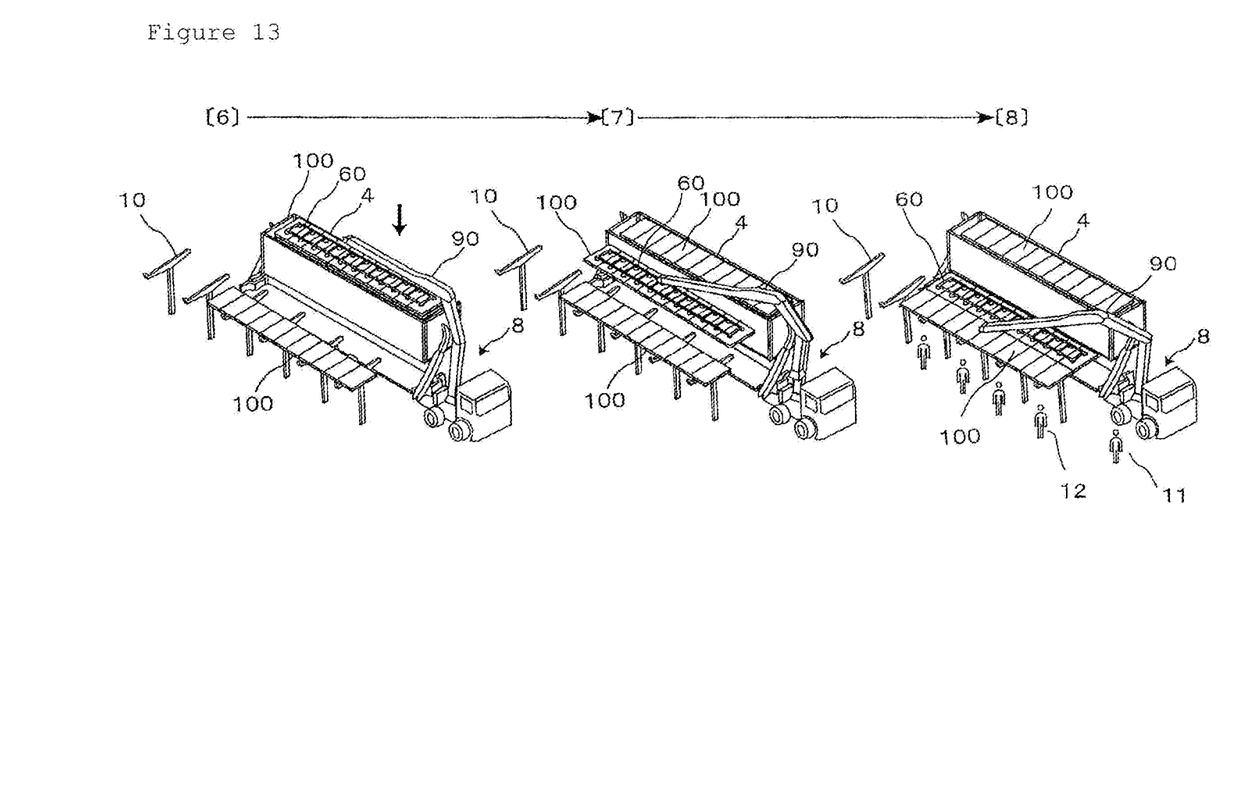
FIG. 13 is an explanatory diagram of a solar string arrangement procedure following the procedure of FIG. 12.

FIG. 12 is an explanatory diagram of a procedure of pulling up the solar strings from the solar string dedicated container and arranging the solar strings on the stands. FIG. 13 is an explanatory diagram of a solar string arrangement procedure following the procedure of FIG. 12. First, as shown in a procedure [1] of FIG. 12, the vacuum suction means 60 attached to the arm 90 of the string dedicated crane pulls up the uppermost solar string 100 housed in the string dedicated container 4. The pulled up solar string 100 is moved to align and mount the center 100C of the solar string 100 on the predetermined stand 10 set in the previous step (procedures [2]-[3] of FIG. 12). The worker manually adjusts the position and fixes the solar string 100 ([4] of FIG. 12). Subsequently, cabling in the string and between the string and the adjacent string installed previously is performed. The position shown in the procedure [1] is called a start position (0 position), and in the work after the installation of the solar string 100 on the predetermined stand 10, that is, in the repetition of the procedures [4]→[6], one button of an operation panel of the worker automatically returns the operation to the start position.

The positioning of the solar string 100 to the center 100C can have a margin of error that ultimately allows the worker to easily perform the work. For example, the alignment is easy for the worker if the margin of error is within several dozen centimeters. Although a GPS can be used to set the positions of the stands, the accuracy of a privately used GPS is about 10 m, and the accuracy is about several m even in a DGPS. Therefore, at this point, it is difficult to use GPS measurement to measure the positions of the stands as in the present invention. However, if the system of the GPS improves in the future, the measurement of the stand positions using the GPS can be adopted in place of the ranging using the laser.

During the execution of the procedures [3]-[4], the solar string at the uppermost position of the solar strings stacked in the solar string dedicated container rises to the uppermost section of the container as indicated by an arrow. The vacuum suction means 60 retracts from the fixed solar string 100 (procedure [5]). The vacuum suction means 60 attached to the arm 90 of the string dedicated crane 9 pulls up the next solar string 100 risen to the uppermost section and arranges the solar string 100 adjacent to the previously installed solar string on the stand (procedures [6]-[7]-[8] of FIG. 12).

Similarly, the arm 90 of the string dedicated crane 9 uses the crane arm movement control means 27 and the arm movement information processing means 28 to sequentially move the arm 90 of the string dedicated crane 9 back and forth between the dedicated container 4 and the predetermined stands 10 based on the stand position information and the sequence schedule stored in the storage means 24.

Figure 14:
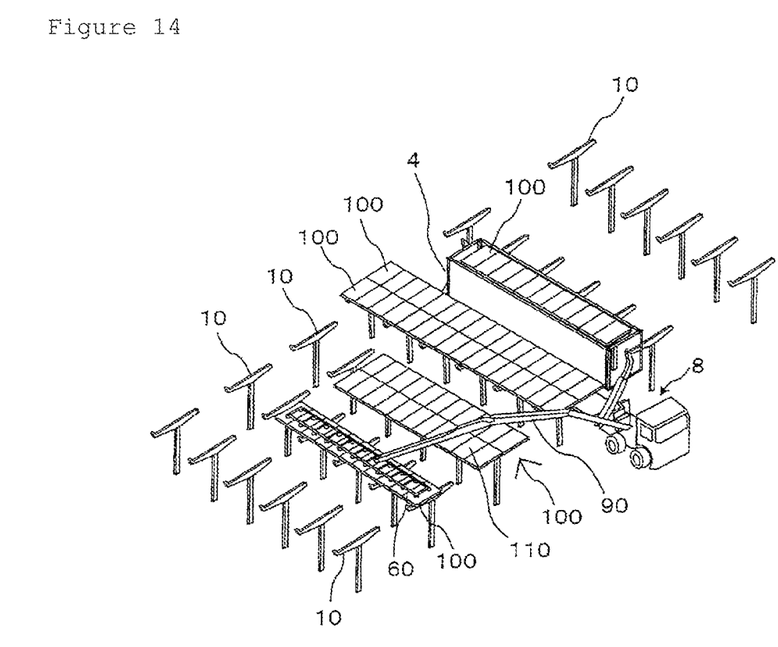
FIG. 14 is an explanatory diagram of a state in which the solar strings are arranged on a third line of the stands installed on one side (right side) of the power plant site construction dedicated heavy machine.

FIG. 14 is an explanatory diagram of a state in which the solar strings are arranged on a third line of the stands installed on one side (right side) of the power plant site construction dedicated heavy machine. In the case illustrated here, the service range of the dedicated crane included in the power plant site construction dedicated heavy machine is up to the third line in the transverse direction of the power plant site construction dedicated heavy machine. The service range in the vehicle length direction of the power plant site construction dedicated heavy machine is a length of six pieces at most (equivalent to twelve solar strings), a length of four pieces in the direction one line away in the transverse direction (equivalent to eight solar strings), and a length of two pieces in the direction two lines away in the transverse direction (equivalent to four solar strings) in the present embodiment, although this depends on the length of the solar strings. Therefore, the number of solar strings installed by the power plant site construction dedicated heavy machine at one place is 48 at most in the present embodiment.

The service range depends on a turning range of the arm of the dedicated crane included in the power plant site construction dedicated heavy machine. The number of workers necessary in the present embodiment is just five in total, one worker for the crane operator 11 and four workers for the adjustment, fixation, and cabling work. The work is repeated to install the solar strings on all stands in the field of the solar power plant site.

Figure 15:
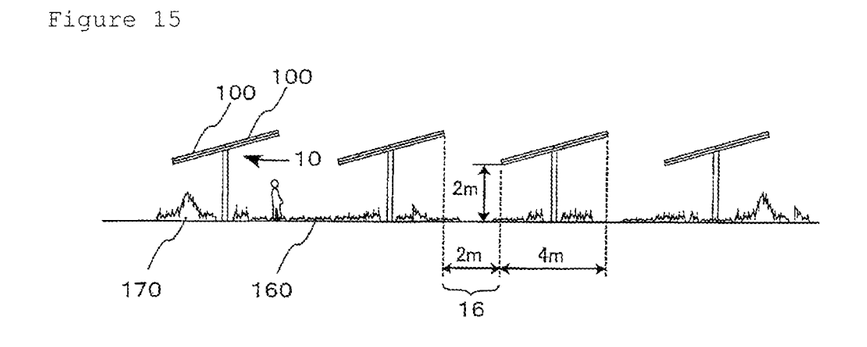
FIG. 15 is a schematic view of part of a field of the power plant site in which the solar strings are installed on the stands, as viewed from the side.
Figure 16:
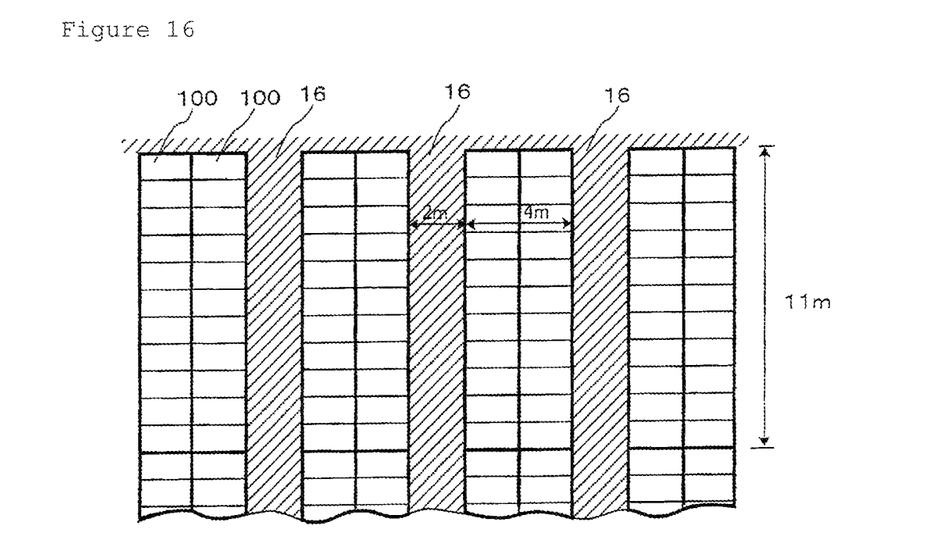
FIG. 16 is a schematic view of the part of the field of the power plant site shown in FIG. 15, as viewed from above.

FIG. 15 is a schematic view of part of the field of the power plant site in which the solar strings are installed on the stands, as viewed from the side. FIG. 16 is a schematic view of the part of the field of the power plant site shown in FIG. 15, as viewed from above. In the present embodiment, two solar strings 100 (two stages) are installed in the inclination direction of the stand. Here, the height of the stand 10 is 2 m on the lower side of the inclination. The height above the ground on the higher side depends on the location conditions of the installation field (such as latitude and undulation of the field). In FIGS. 15 and 16, the inclination on the lower side of the stand is 2 m, and the distance between the rows is 2 m so that the shadow of the row of stands does not cast over the row of stands on the back side. This part is a management passage 16.

In the management passage 16, a plant zone 160 with a low height is provided to prevent obstructing the passage of the management workers, and a plant zone 170 with an appropriate height lower than the stand is provided on the lower side of the stand 10 to increase the water holding capacity. It is desirable to provide the plant zones 160 and 170 by plant guide spray used in surface processing of a slope surface of a road.

As for the installation angle of the solar strings 100 with respect to the sun, the installation angle substantially coincides with the latitude when the installation direction of the strings is due south. Largest solar radiation can be received by setting the direction to due south if there is no obstacle in the surrounding that casts shadow. For the installation angle of the solar strings, the "solar radiation database" disclosed by New Energy and Industrial Technology Development Organization (NEDO) can be viewed. However, the installation direction cannot be due south depending on the location conditions of the field, and the most efficient installation angle is set under the location conditions of the field in the power plant site.

According to the present embodiment, a solar power plant construction method can be obtained that can reduce the construction period with a small number of workers and ensure the safety of the work and that can be installed at a low cost.

INDUSTRIAL APPLICABILITY

Although the present invention is described as a construction method of solar strings in the embodiment, the present invention can be applied to assemble planar shapes similar to the solar strings and to convey and install the planar shapes on an implementation site.

REFERENCE SIGNS LIST

4 . . . string dedicated container
5 . . . in-plant crane
6, 60 . . . vacuum suction means (vacuum gripper)
7 . . . container truck (trailer truck)
8 . . . power plant site construction dedicated heavy machine (specially rigged heavy machine)
80 . . . container transfer apparatus
9 . . . string dedicated crane
90 . . . arm
10 . . . stand
11 . . . crane operator
12 . . . worker 13 . . . laser head
14 . . . laser beam
14A . . . reflected light
15 . . . reference pole
20 . . . laser controller
21 . . . reference pole distance calculation means
22 . . . reference pole horizontal angle calculation means
23 . . . CPU
24 . . . storage means
25 . . . display means
26 . . . operator interface
27 . . . crane arm movement control means
28 . . . arm movement information processing means
29 . . . crane controller
30 . . . printer
31 . . . communication control means
32 . . . portable terminal
100 . . . solar string
100C . . . center part of solar string
110 . . . solar module
111 . . . bolt and nut
120 (120a, 120b) . . . support frame
160 . . . plant zone with low height
170 . . . plant zone with appropriate height lower than stand

The invention claimed is:

1. A solar power plant construction method of arranging a large number of solar strings in an array to form a large-scale power plant, the solar power plant construction method sequentially executing:
   a string formation step of delivering solar modules to a pre-assembly factory provided in a place different from a power plant site to arrange a predetermined number of unpacked solar modules on support frames to fix the solar modules as solar strings and applying cabling work in string for connecting the solar modules by electric cables in the solar strings to form planar solar strings;
   a string dedicated container conveyance step of stacking and housing a plurality of the solar strings in a string dedicated container and loading the string dedicated container on a container truck to convey the string dedicated container to the power plant site;
   a string dedicated container arrangement step of transferring the string dedicated container delivered to the power plant site to a site construction dedicated heavy machine and placing the site construction dedicated heavy machine at a predetermined position of a stand array group for mounting solar array provided in a field of the power plant site;
   a stand position measurement step of measuring distances and directions between a string dedicated crane included in the site construction dedicated heavy machine placed at the predetermined position of the stand array group and respective stands; and
   a solar string installation step of running the string dedicated crane of the site construction dedicated heavy machine to pull up the solar strings stacked and housed in the string dedicated container from above the string dedicated container to sequentially distribute the solar strings to respective stand positions measured in the stand position measurement step to form and fix a solar array and applying cabling in the solar array for applying wiring connection between the strings in the solar array and the cabling in site for applying the wiring connection in site.

2. The solar power plant construction method according to claim 1, wherein
   the string dedicated container comprises a string raising mechanism that sequentially moves a next solar string to an uppermost layer every time the string dedicated crane included in a string dedicated heavy machine pulls up one solar string on the uppermost layer among the solar strings loaded inside of the string dedicated container.

3. The solar power plant construction method according to claim 1, wherein the site construction dedicated heavy machine is sequentially moved and placed in a connection area outside of range after completion of the installation of the solar strings on the stands in limited range to execute the stand position measurement step and the solar string installation step.

4. The solar power plant construction method according to claim 1, wherein
   the solar string is formed by ten or eleven solar modules.

5. The solar power plant construction method according to claim 1, wherein
   the string dedicated crane of the site construction dedicated heavy machine comprises: crane control means; crane arm movement control means; and arm movement information processing means for providing movement information of an arm obtained in the stand position measurement step to the crane arm movement control means, and
   a range of the stands covered by the arrangement work of the solar strings by the arm around the placement position of the site construction dedicated heavy machine is limited.

6. The solar power plant construction method according to claim 5, wherein
   laser ranging means is provided on left and right sides of the site construction dedicated heavy machine and measures the position information of the distances and the directions of the stands in a working limit of the string dedicated crane on the left and right sides.

7. The solar power plant construction method according to claim 1, wherein the site construction dedicated heavy machine comprises laser ranging means provided at a predetermined height looking into a height above a ground surface of the solar strings to be arranged and configured to measure the distances and the directions of the stands covered by the arrangement work of the solar strings by an arm of the string dedicated crane around the placement position of the solar power plant site construction dedicated heavy machine, and
   arm movement information processing means uses stand position information from stand position information stored in storage means for storing position information of the
stands measured by the laser ranging means to control movement of the string dedicated crane and uses the position information of the stands stored in the storage means to transfer the solar strings hung out from the string dedicated container by string dedicated arm to the stands.

8. The solar power plant construction method according to claim 7, wherein the position information of the distances and the directions of the stands calculated by said laser ranging means is calculated based on reflected light of a laser beam applied to reference poles sequentially disposed at a predetermined height near centers of the stands on which the solar strings are mounted according to the height above the ground surface of the laser ranging means.

* * * * *